US011903361B2

(12) United States Patent
Mars et al.

(10) Patent No.: US 11,903,361 B2
(45) Date of Patent: Feb. 20, 2024

(54) CRATE FOR THE RIPENING OF A CHEESE

(71) Applicant: Royal Bel Leerdammer B.V., Schoonrewoerd (NL)

(72) Inventors: Anthoni Arnold Mars, Dalfsen (NL); David Joseph Odier, Utrecht (NL)

(73) Assignee: ROYAL LACTALIS LEERDAMMER B.V., Schoonrewoerd (NL)

( * ) Notice: Subject to any disclaimer, the term of this patent is extended or adjusted under 35 U.S.C. 154(b) by 765 days.

(21) Appl. No.: 17/041,268

(22) PCT Filed: Apr. 4, 2019

(86) PCT No.: PCT/EP2019/058552
§ 371 (c)(1),
(2) Date: Sep. 24, 2020

(87) PCT Pub. No.: WO2019/193114
PCT Pub. Date: Oct. 10, 2019

(65) Prior Publication Data
US 2021/0068365 A1 Mar. 11, 2021

(30) Foreign Application Priority Data
Apr. 4, 2018 (EP) .................................. 18305396

(51) Int. Cl.
*A01J 25/16* (2006.01)
*A01J 25/13* (2006.01)

(52) U.S. Cl.
CPC ............ *A01J 25/162* (2013.01); *A01J 25/13* (2013.01)

(58) Field of Classification Search
CPC .......... A01J 25/13; A01J 25/162; A01J 25/16; A01J 25/12
See application file for complete search history.

(56) References Cited

U.S. PATENT DOCUMENTS 2,596,881 A * 5/1952 White ............... B65D 21/0213
220/628
5,227,079 A * 7/1993 Tameris .................. A01J 25/13
425/84
(Continued)

FOREIGN PATENT DOCUMENTS

DE 692504 * 6/1940 ............. A01J 25/13
EP 0823991 2/1998
(Continued)

OTHER PUBLICATIONS

International Search Report dated Jun. 21, 2019 in corresponding PCT Application No. PCT/EP2019/058552.
(Continued)

*Primary Examiner* — Reginald Alexander
(74) *Attorney, Agent, or Firm* — DUANE MORRIS LLP (57) ABSTRACT

A crate (1) for a cheese, said crate (1) comprising a base (2), an open top (3) substantially parallel to the base (2), a peripheral wall (4), the peripheral wall (4) forming a closed contour and forming with the base (2) a space (8) intended to receive the cheese, the peripheral wall (4) comprising a medium portion (29) which is approximately at mid-height of the space (8) intended to receive the cheese and further having at least one through-hole (36, 60) formed therein. The peripheral wall (4) comprises a solid strip (27) enclosing the space (8) intended to receive the cheese while being substantially parallel to the base (2), said solid strip (27) including the medium portion (29) of the peripheral wall (4) and having a minimum height which is at least 15% of the height of the space (8) intended to receive the cheese.

17 Claims, 7 Drawing Sheets

(56) References Cited

U.S. PATENT DOCUMENTS 5,253,568 A * 10/1993 Prella .................... A01J 25/162
99/458
2011/0240660 A1    10/2011 Orgeldinger

FOREIGN PATENT DOCUMENTS

| EP | 0888710 | 1/1999 | | |
| FR | 2248782 | * 10/1973 | .............. | A01J 25/13 |
| GB | 2439539 | 1/2008 | | |

OTHER PUBLICATIONS

European Search Report dated Sep. 26, 2018 in corresponding EP Patent Application No. 18305396.6.

* cited by examiner

FIG.7

CRATE FOR THE RIPENING OF A CHEESE

CROSS-REFERENCED TO RELATED APPLICATIONS

This application is a § 371 national stage entry of International Application No. PCT/EP2019/058552, filed Apr. 4, 2019, which claims priority to European Patent Application No. 18305396.6, filed Apr. 4, 2018, the entire contents of which are incorporated herein by reference.

FIELD

The present invention concerns a crate for the ripening of a cheese.

BACKGROUND

Ripening is a key process step in Maasdammer and Swiss-type cheese production and is a key contributor to eyes formation and desired sensorial properties in terms of taste and texture.

It is common to use rectangular foil ripened cheese blocks for slicing with minimum amount of waste coming from end cuts.

After having been removed from a brine bath, the block-shaped cheeses are packaged in a plastic film and are then subjected to the ripening process.

Typical for these cheese types are the elevated temperatures applied during the ripening, the so called 'hot-room or warm-curing period' to boost fermentation by propionic acid bacteria. During the ripening phase, these cheeses exhibit considerable and rapid gas evolution as a result of propionic acid fermentation.

After cheeses are sufficiently ripened the cheeses are cooled down for further processing.

Keeping the shape of the cheese is of particular importance during ripening.

It is known to ripen several block-shaped cheeses in a container crate. However, due to cheese expansion during ripening, the block shape is not maintained. That is to say that is not possible to obtain the desired rounded cheese slice shape with this kind of crates.

EP0888710 describes a crate for the ripening of a single block-shaped cheese. The crate comprises a base, an open top substantially parallel to the base, two side sections and two end sections forming together a closed contour. A large through-hole is formed in each end section, approximately centered on this section. When ripening several cheeses at the same time, a plurality of crates is used and each cheese is placed in a respective crate. The crates are then stacked on a pallet in order to optimize the number of ripening cheeses. However, at the end of the ripening, cheeses located close to the bottom of the ripening pallet and cheeses located close to the top of the ripening pallet have been subjected to differential propionic fermentation, leading to cheeses with differences in the eye formation. Furthermore, while the shape of the cheeses is well maintained along their sides, it is not the case at their longitudinal ends, which are usually swelled at the end of the ripening phase.

One aim of the invention is thus to allow defining the shape of the ripening cheese, while ensuring proper ventilation of said cheese.

To that end, the invention relates to a crate for a cheese, said crate comprising a base, an open top substantially parallel to the base, a peripheral wall extending from the base to the top in a vertical direction, the peripheral wall forming a closed contour and forming with the base a space intended to receive the cheese, said space having a height along the vertical direction, the peripheral wall comprising a medium portion which is approximately at mid-height of the space intended to receive the cheese and further having at least one through-hole formed therein, the peripheral wall comprises a solid strip enclosing the space intended to receive the cheese while being substantially parallel to the base, said solid strip including the medium portion of the peripheral wall and having a minimum height which is at least 15 of the height of the space intended to receive the cheese.

According to specific embodiments of the invention, the crate also has one or more of the following features, considered alone or according to any technically possible combination(s):

- the crate comprises at least one pair of runners on the base, each runner being formed in the lower face of the base of the crate, along the rim of the base, opposite the other runner of the pair, and at least one pair of complementary rails formed on the top of the peripheral wall so that, when the crate is stacked under an identical crate, each rail of the crate is engaged inside a runner of said identical crate;
- the base has two longitudinal ends, each runner extending from one longitudinal end of the base to the opposite longitudinal end, and opening in both longitudinal ends;
- through holes are provided both below and above the solid strip;
- the base has a substantially plane upper face oriented toward the top, and the peripheral wall has an inner face oriented toward the space intended to receive the cheese, said inner face including a vertical portion forming with the upper face of the base an angle comprised between 90° and 95°, said vertical portion enclosing the inner face of the solid strip of the peripheral wall;
- the peripheral wall includes at least one section with an inner face including a vertical part of the vertical portion and an inclined portion forming with the vertical part an angle comprised between 105° and 175°, the inclined portion having a minimum height which is at least 5 mm, the inclined portion being above the vertical part;
- the peripheral wall consists of several sections juxtaposed to each other along the periphery of the base, said sections comprising two end sections positioned on opposite ends of the base in a longitudinal direction, and two side sections positioned on opposite sides of the base in a transversal direction substantially perpendicular to the longitudinal direction;
- each section has at least one through-hole formed therein;
- each side section has an exterior face oriented opposite the space intended to receive the cheese, at least one longitudinal groove being formed in said exterior face and opening in the end sections so that, when the crate is placed alongside an identical crate, the longitudinal grooves of the two crates face each other, thus forming a longitudinal channel between the crates;
- each side section has an exterior face oriented opposite the space intended to receive the cheese, at least one vertical groove being formed in said exterior face and opening in the base and in the top so that, when the crate is placed under an identical crate, the vertical grooves of the two crates face each other, thus forming a vertical channel between the crates;

each side section has an upper edge that is substantially parallel to the base, the upper edges of both side section being comprised in a same plane, and wherein each end section has an upper edge, the upper edge of at least one of the end sections being recessed from said plane of at least 5% of the height of the space intended to receive the cheese; and each side section and each end section is substantially rectilinear.

the crate comprises gripping elements located at the interface between the lower face of the base and the exterior face of at least one of the end sections, the gripping elements consisting of reliefs fixed to the lower face of the base and to the exterior face of at least one of the end sections, the projection of each gripping element in a plane comprising the vertical direction and the longitudinal direction having a continuous profile with a slope that varies continuously.

The invention also concerns a method for ripening at least one cheese, the method comprising the steps of:

a. providing the or each cheese;

b. placing the or each cheese in a respective crate, said respective crate consisting of a crate according to the method; and c. ripening the or each cheese in its respective crate.

According to specific embodiments of the invention, the method also has one or more of the following features, considered alone or according to any technically possible combination(s):

at least two cheeses are provided at step a., the method further comprising between step b. and step c. a step d. of stacking the crates; and the cheese consists of a cheese which shape has to be managed during the manufacturing process of the cheese.

BRIEF DESCRIPTION OF THE DRAWINGS

Other features and advantages of the invention will appear upon reading the following description, provided solely as an example and done in reference to the appended drawings, in which.

SUMMARY

Figure 1:
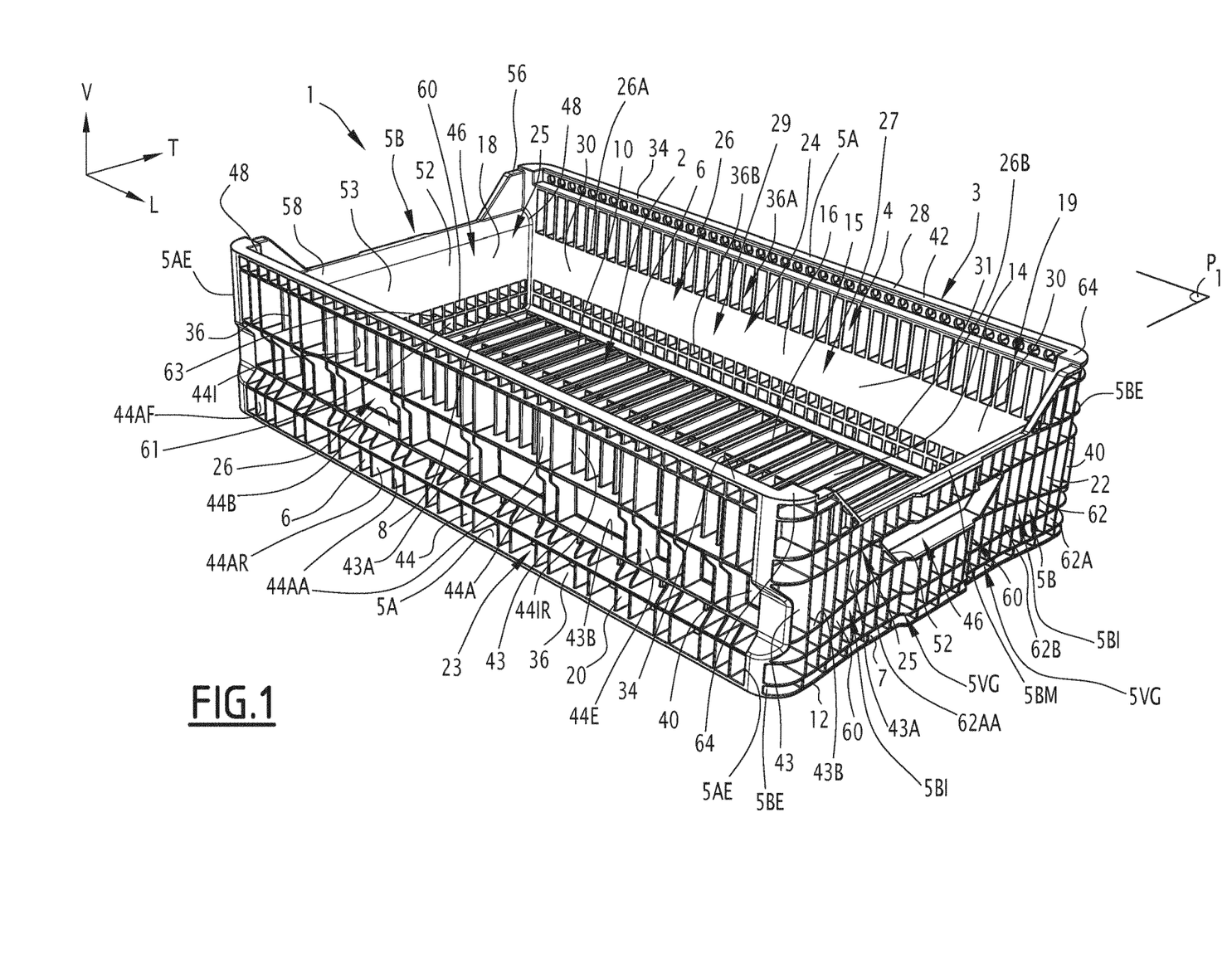
FIG. 1 shows a perspective view of a crate according to a first embodiment of the invention.
Figure 2:
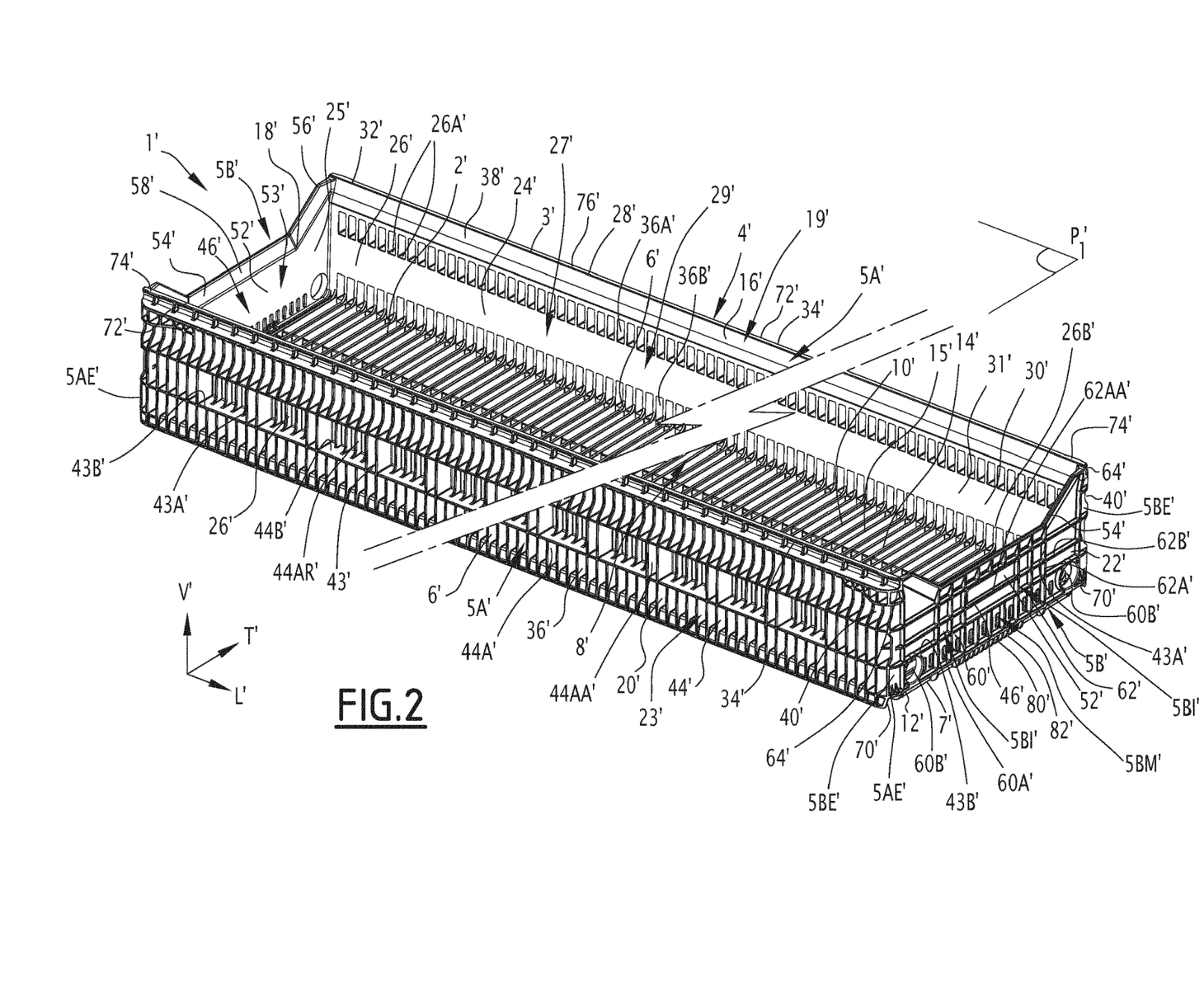
FIG. 2 shows a perspective view of a crate according to a second embodiment of the invention.

Crates 1, 1' according to the invention for ripening block-shaped cheeses are shown in FIGS. 1 and 2. Each crate 1, 1' comprises a base 2, 2', an open top 3, 3' substantially parallel to the base 1, 1' and a peripheral wall 4, 4' extending from the base 2, 2' to the top 3, 3' in a vertical direction V, V.

The peripheral wall 4, 4' forms a closed contour.

The peripheral wall 4, 4' consists of several sections 5A, 5A', 5B, 5B' juxtaposed to each other along the periphery of the base 2, 2'. In the examples shown in FIGS. 1 and 2, each section 5A, 5A', 5B, 5B' is rectilinear, so that the peripheral wall 4, 4' has a polygonal shape. In alternative embodiments (not shown), at least one section 5A, 5A', 5B, 5B' is bent, and the interface between two sections 5A, 5A', 5B, 5B' is recognizable by a change in the radius of curvature of the peripheral wall 4, 4', the peripheral wall 4, 4' having, for instance, a floral shape. In other alternative embodiments (not shown), each section 5A, 5A', 5B, 5B' is bent, without the interface between two sections 5A, 5A', 5B, 5B' being recognizable, the peripheral wall 4, 4' having, for example, a circular shape, an elliptical shape, an ovoid shape, or an oval shape; in such a case, the peripheral wall 4, 4' may also be contemplated as comprising a single section.

In the examples shown in FIGS. 1 and 2, the sections 5A, 5A', 5B, 5B' are in a number of four and comprise two side sections 5A, 5A' and two end sections 5B, 5B'. The two side sections 5A, 5A' extend along two opposite sides 6, 6' of the base 2, 2', from the base 2, 2' to the top 3, 3'. The two end sections 5B, 5B' extend along two opposite ends 7, 7' of the base, from the base 2, 2' to the top 3, 3'.

In alternative embodiments (not shown), the number of sections 5A, 5A', 5B, 5B' is more or less than four, so that the peripheral wall 4, 4' may have, for example, a triangular shape, a star shape, or any shape contemplated by a person skilled in the art.

The peripheral wall 4, 4' delimits with the base 2, 2' a space 8, 8' intended to receive the cheese. In the whole description, the space 8, 8' intended to receive the cheese is also referred to as "the inside of the crate" or "inside".

The space 8, 8' extends from the base 2, 2' to the top 3, 3'.

The crate 1, 1' is preferably made out of plastic, for example:

Thermoplastics such as Acrylic, ABS, Nylon (PA), PLA, Polycarbonate (PC),

Polyethylene (PE), Polypropylene (PP), Polystyrene (PS), Polyvinyl chloride (PVC), etc.;

Thermosetting plastics such as Melamine, Epoxy, Polyurethane, Bakelite, etc.

According to variants, the crate 1, 1' is made out of wood, plywood, metals and alloys such as steel, aluminum, copper, brass, etc.

The base 2, 2' has a substantially plane upper face 10, 10' oriented toward the top 3, 3'.

The base 2, 2' comprises a lower face 12, 12' opposite the upper face 10, 10'. The base 2, 2' is substantially rectangular. The base 2, 2' is elongated along a longitudinal direction L, L'.

The two opposite sides 6, 6' of the base 2, 2' extend along the longitudinal direction L, L' and are spaced apart from each other along a transversal direction T, T' that is substantially perpendicular to the longitudinal direction L, L'.

The two opposite ends 7, 7' of the base 2, 2' extend along the transversal direction T, T' and are spaced apart from each other along the longitudinal direction L, L'.

It is further defined a vertical direction V, V' that is substantially perpendicular to the longitudinal direction L, L' and to the transversal direction T, T'.

A length of the base 2, 2' is measured in the longitudinal direction L, L' between the two end sections 5B, 5B' in the space 8, 8' intended to receive the cheese.

Typically, the base 2, 2' has a length comprised between 100 mm and 2500 mm.

A width of the base 2, 2' is measured in the transversal direction T, T' between the two side sections 5A, 5A' in the space 8, 8' intended to receive the cheese.

Typically, this width is comprised between 220 mm and 270 mm.

However, the base 2, 2' may have different dimensions adapted to the dimensions of the cheese to be ripened.

For example, for a square-shaped crate, the base 2, 2' typically has a length comprised between 100 mm and 2500 mm. In this example, the base typically has a width comprised between 100 mm and 2500 mm.

For example, for a rectangular crate, the base 2, 2' typically has a length comprised between 200 mm and 2500 mm. In this example, the base typically has a width comprised between 100 mm and 2000 mm.

For example, for an elliptical crate, the base 2, 2' typically has a length, measured along the major axis of the ellipse, comprised between 200 mm and 2500 mm. In this example, the base typically has a width comprised between 100 mm and 2000 mm.

For example, for a triangular crate, the base 2, 2' typically has a length comprised between 100 mm and 2000 mm.

A thickness of the base 2, 2' is measured in the vertical direction V, V' between the upper face 10, 10' and the lower face 12, 12' of the base 2, 2'.

Typically, the base 2, 2' has a thickness comprised between 10 mm and 20 mm.

Figure 4:
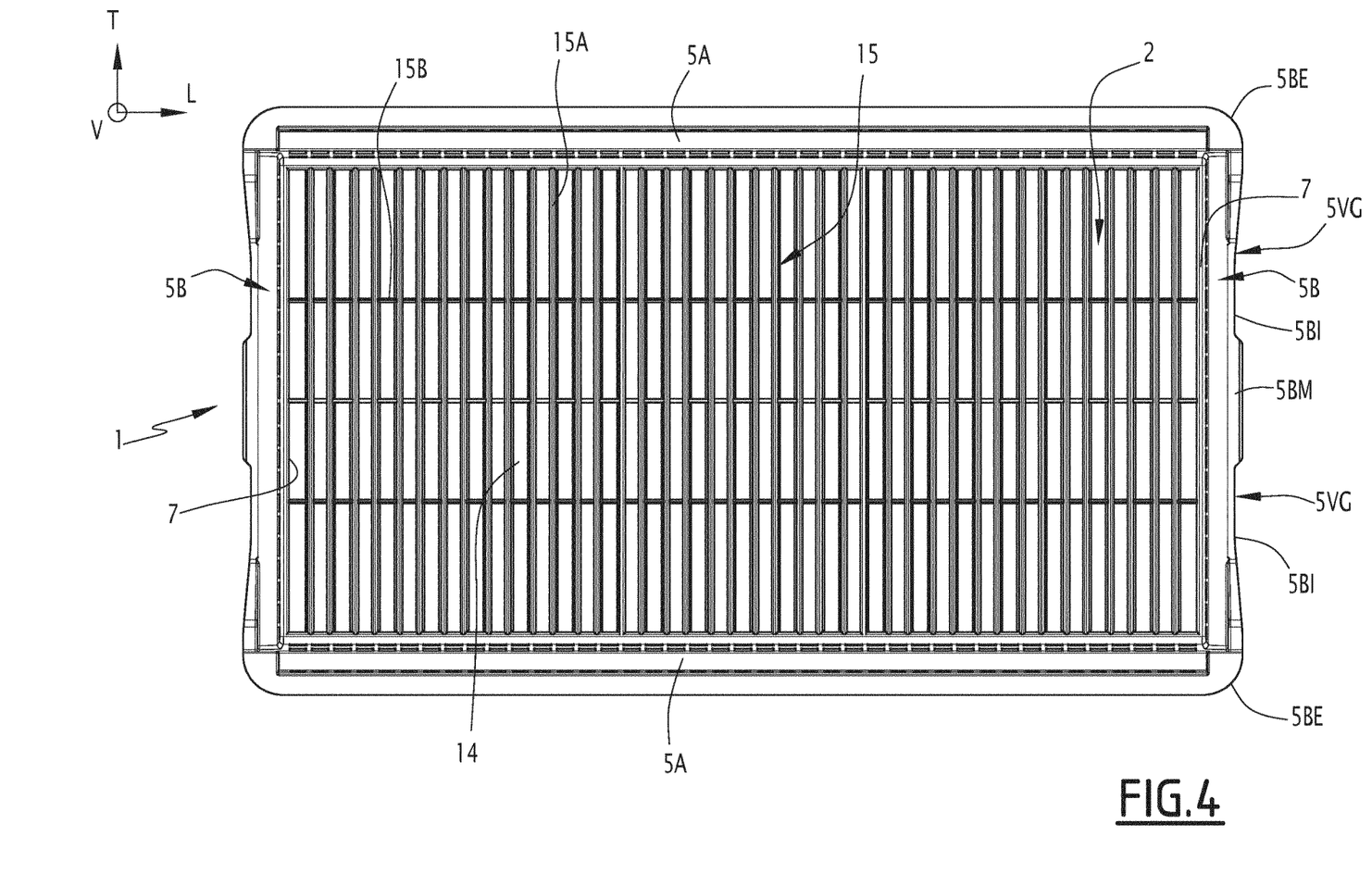
FIG. 4 shows a top view of the crate of FIG. 1.
Figure 5:
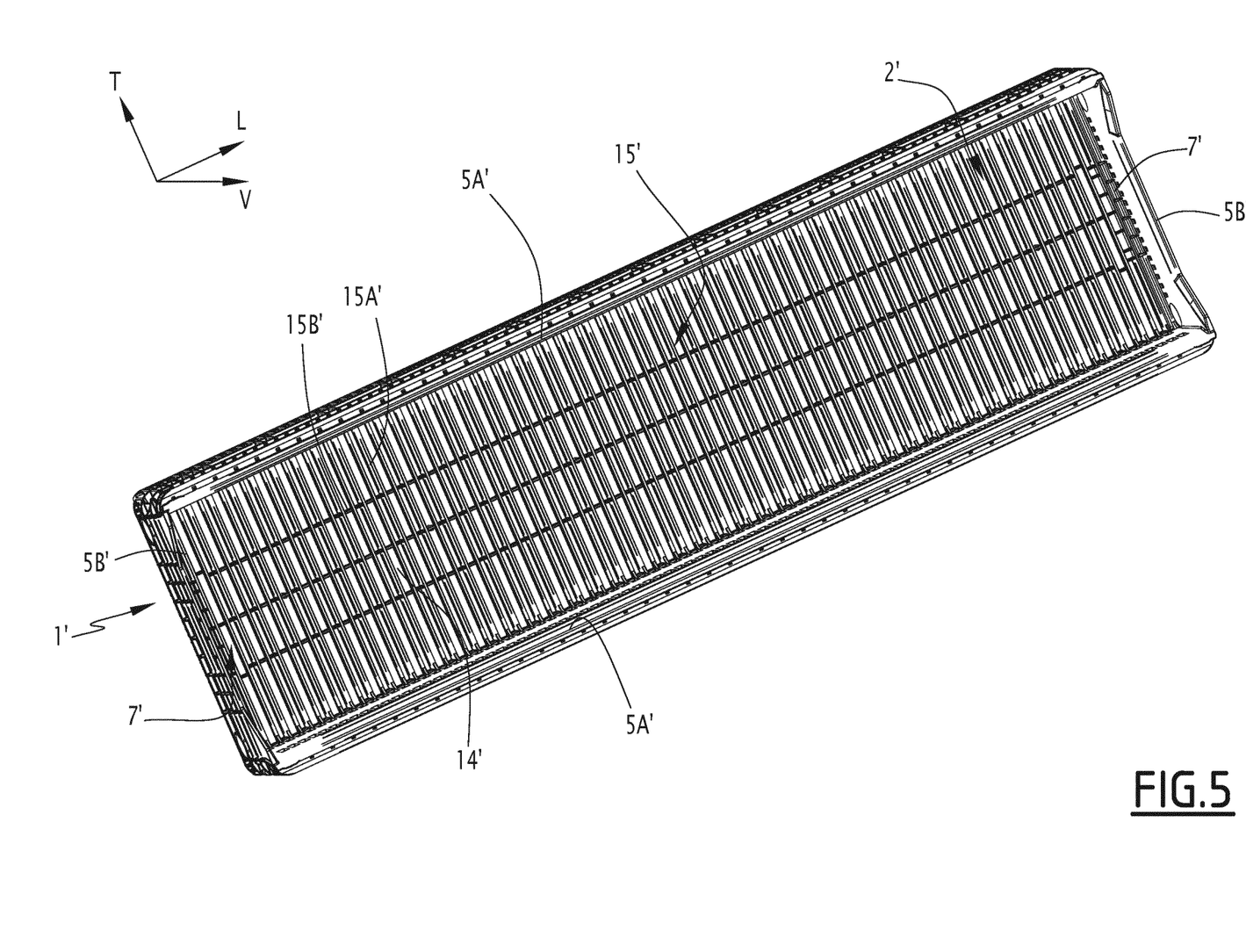
FIG. 5 shows a top view of the crate of FIG. 2.

Typically, as shown in FIGS. 4 and 5, the base 2, 2' comprises through holes 14, 14' formed therein. The through holes 14, 14' are dimensioned so that a standard cheese block intended to be put in the crate 1, 1' has a surface intended to face the upper face 10, 10' of the base 2, 2' that is greater than the surface of each through-hole 14, 14' formed in the base 2, 2'. In particular, each through hole 14, 14' has a shape of a rectangle of which width is comprised between 4 mm and 10 mm.

Typically, the base 2, 2' consists of interlaced ribs 15, 15' which are at right angles to one another.

In particular, the base 2, 2' comprises transversal ribs 15A, 15A'. The transversal ribs 15A, 15A' extend along the transversal direction T, T' from one side section 5A, 5A' to the other side section 5A, 5A'.

The transversal ribs 15A, 15A' are preferably substantially parallel to one another and regularly spaced. Preferably, the space between two consecutive transversal ribs 15A, 15A' is comprised between 4 mm and 10 mm. Each transversal rib 15A, 15A' has a thickness in the vertical direction V, V' comprised between 10 mm and 20 mm.

Figure 6:
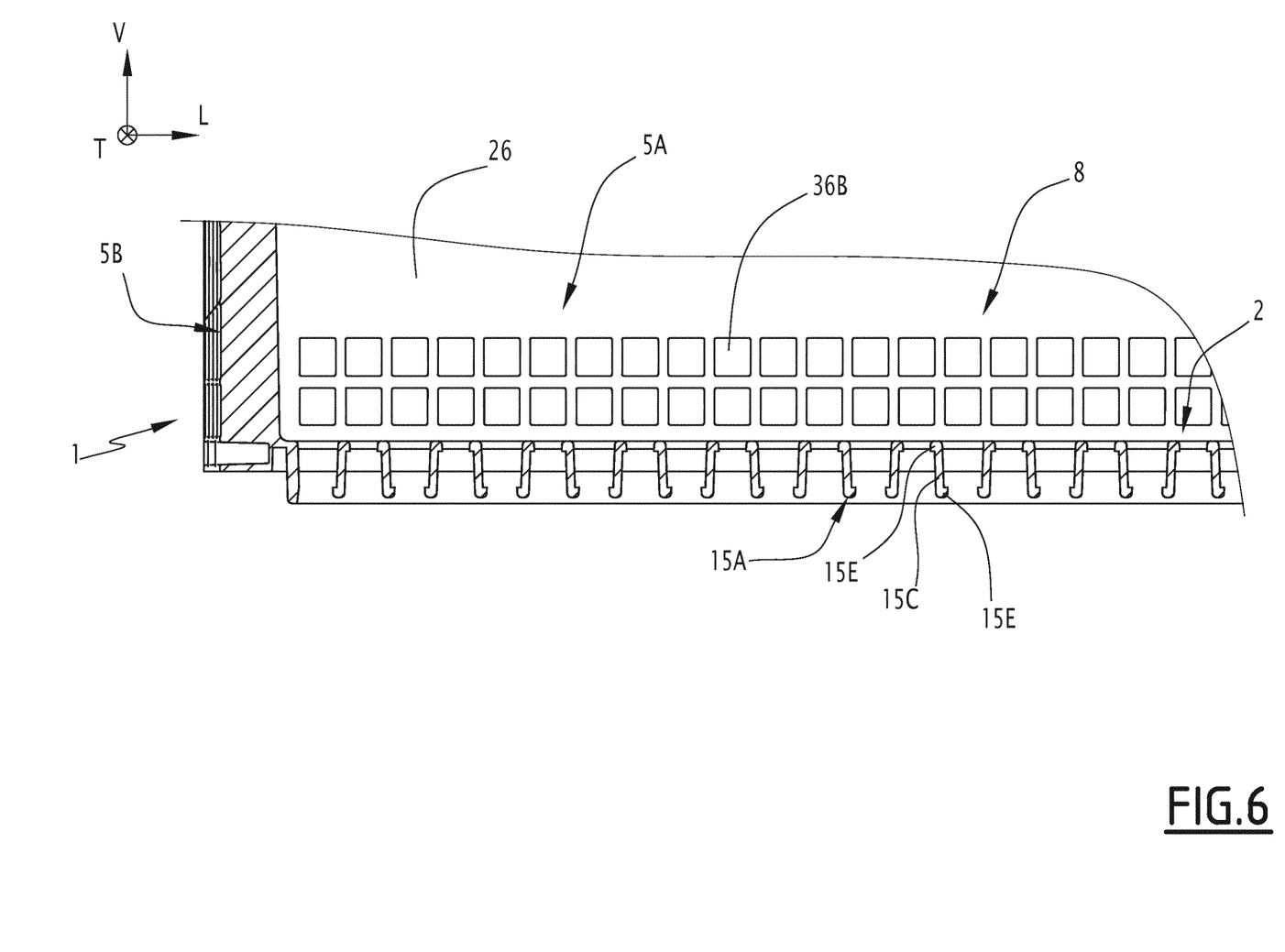
FIG. 6 shows an enlarged view of a longitudinal section of the crate of FIG. 1.

Preferably, as shown in FIG. 6, each transversal rib 15A, 15A' has a Z-shaped longitudinal section comprising a central portion 15C extending along the vertical direction V, V' and two extreme portions 15E each protruding from a respective side of the central portion 15C along the longitudinal direction L, L'. The central portion 15C is elongated along the vertical direction V, V'. The extreme portions 15E are vertically offset from one another and in particular are each positioned at a respective vertical end of the central portion 15C.

For each pair of consecutive transversal ribs 15A, 15A', said ribs 15A, 15A' are symmetrical with respect to a plane comprising the vertical direction V, V' and the transversal direction T, T'.

In the shown examples, the base 2, 2' also comprises longitudinal ribs 15B, 15B'. The longitudinal ribs 15B, 15B' extend along the longitudinal direction L, L' between the two end sections 5B, 5B'.

Thus, both the transversal ribs 15A, 15A' and the longitudinal ribs 15B, 15B' extend in a plane substantially perpendicular to the vertical direction V, V.

The longitudinal ribs 15B, 15B' are preferably substantially parallel to one another and regularly spaced. Preferably, the longitudinal ribs 15B, 15B' are substantially perpendicular to the transversal ribs 15A, 15A'.

Each longitudinal rib 15B, 15B' has a thickness in the vertical direction V, V' comprised between 10 mm and 20 mm.

In the examples of FIGS. 4 and 5, the base 2, 2' comprises three longitudinal ribs 15B, 15B'. One central longitudinal rib 15B, 15B' extends between the middles of the opposite ends 7, 7' of the base 2, 2'. The two other longitudinal ribs 15B, 15B' extend symmetrically on both sides of the central longitudinal rib 15B, 15B'. Preferably, the space between two consecutive longitudinal ribs 15B, 15B' is comprised between 10 mm and 60 mm.

Each space formed between two consecutive transversal ribs 15A, 15A' along the longitudinal direction L, L' and two consecutive longitudinal ribs 15B, 15B' along the transversal direction T, T' constitutes one of the through holes 14, 14' discussed above. Such through holes 14, 14' are also constituted by the spaces formed between two consecutive transversal ribs 15A, 15A' along the longitudinal direction L, L', a longitudinal rib 15B, 15B' and a side section 5A, 5A' along the longitudinal direction L, L'.

In alternative embodiments (not shown), the ribs 15, 15' comprise only transversal ribs 15A, 15A' or only longitudinal ribs 15B, 15B'.

Such a configuration of the base 2, 2' increases strength and stiffness of the crate 1, 1' in order to maintain the shape of a cheese during ripening, in particular a cheese with a propionic fermentation which expands during ripening, while ensuring a proper ventilation of the cheese.

Each section 5A, 5A', 5B, 5B' has an inner face 16, 16', 18, 18' oriented toward the space 8, 8' intended to receive the cheese. These inner faces 16, 16', 18, 18' form together an inner face 19, 19' of the peripheral wall 4, 4'.

Each section 5A, 5A', 5B, 5B' further has an exterior face 20, 20', 22, 22' oriented opposite the space 8, 8' intended to receive the cheese. These exterior faces 20, 20', 22, 22' form together an exterior face 23, 23' of the peripheral wall 4, 4'.

Each section 5A, 5A', 5B, 5B' comprises a medium portion 24, 24', 25, 25' which is approximately at mid-height of the space 8, 8' intended to receive the cheese. These medium portions 24, 24', 25, 25' form together a medium portion 29, 29' of the peripheral wall 4, 4'.

Each section 5A, 5A', 5B, 5B' further comprises a solid portion 26, 26', 46, 46'. By "solid portion" is intended herein that said portion is not interrupted by holes having a surface larger than 5 mm². Preferably, no hole is provided in said solid portion 26, 26', 46, 46'.

The solid portions 26, 26', 46, 46' of the several sections 5A, 5A', 5B, 5B' form together a solid strip 27, 27' enclosing the space 8, 8' intended to receive the cheese. This strip 27, 27' allows the crate 1, 1' to be able to withstand the pressure exerted thereon by the expanding cheese during its ripening, thus defining the shape of the cheese.

Each solid portion 26, 26', 46, 46' includes the medium portion 24, 24', 25, 25' of the section 5A, 5A', 5B, 5B' which it is part of. Thus, the solid strip 27, 27' includes the medium portion 29, 29' of the peripheral wall 4, 4'.

The solid strip 27, 27' is preferably continuous, as shown here. Alternatively, the solid strip 27, 27' is interrupted by at least one slit, said slit having a width which is less than 0.3 mm.

The solid strip 27, 27' is substantially parallel to the base 2, 2'.

The solid strip 27, 27' extends continuously along at least 90% of the length of each side section 5A, 5A' and along at least 90% of the width of each end section 5B, 56'. In particular, in the embodiments described, the solid strip 27, 27' extends over the entire length of each side section 5A, 5A' and over the entire width of each end section 5B, 56'.

The height of the space 8, 8' intended to receive the cheese is defined as the height of the inner face 16, 16' of a side section 5A, 5A' along the vertical direction V, V' between the upper face 10, 10' of the base 2, 2' and the uppermost part 28, 28' of the side section 5A, 5A'. This height is equal to the distance from the base 2, 2' to the top 3, 3'.

The solid strip 27, 27' has a minimum height which is at least 15% of the height of the space 8, 8' intended to receive the cheese.

In the embodiments shown, the solid portion 26, 26' of each side section 5A, 5A' has a height comprised between 15% and 100%, preferably between 15% and 80%, of the height of the space 8, 8' intended to receive the cheese. The solid portion 26, 26' of each side section 5A, 5A' comprises an upper longitudinal edge 26A, 26A' and a lower longitudinal edge 26B, 26B'.

In the first embodiment, the solid portion 46 of the end section 5B has a height comprised between 10% and 50% of the height of the space 8 intended to receive the cheese. The height of the solid portion 46 is greater near the interface 48 between the inner face 18 of each end section 5B and the inner face 16 of the adjacent side section 5A than in the middle of the solid portion 46 along the transversal direction T. The maximum height of the solid portion 46 is comprised between 40% and 50% of the height of the space 8 intended to receive the cheese. The minimum height of the solid portion 46 in the middle of the solid portion 46 is comprised between 10% and 15% of the height of the space 8 intended to receive the cheese.

In the second embodiment, the solid portion 46' of the end section 5B' has a constant height comprised between 15% and 70% of the height of the space 8' intended to receive the cheese.

In the Examples of FIGS. 1 and 2, the inner face 16, 16' of each side section 5A, 5A' includes a vertical portion 30, 30' forming with the upper face 10, 10' of the base 2, 2' an angle comprised between 90° and 95°, in particular between 90° and 92°. The vertical portion 30, 30' includes the inner face of the solid portion 26, 26' of the side section 5A, 5A'.

In the first embodiment, the vertical portion 30 of the side section 5A extends over the entire height of the inner face of the side section 5A.

In the second embodiment, the inner face 16' of each side section 5A' has an inclined portion 32' forming with the vertical portion 30' an angle comprised between 105° and 175°. Typically, the inclined portion 32' forms with the vertical portion 30' an angle comprised between 105° and 165°.

The inclined portion 32' is located above the vertical portion 30'. The inclined portion 32' has a minimum height along the vertical direction V' of at least 5 mm. Such an inclined portion 32' allows guiding the cheese when it is inserted inside the crate 1'.

In the Examples of FIGS. 1 and 2, each side section 5A, 5A' further has an upper edge 34, 34' that is substantially parallel to the base 2, 2'. The upper edges 34, 34' of both side sections 5A, 5A' are comprised in a same first plane P1, P1'.

Typically, the inner face 16, 16' of each side section 5A, 5A' has a length along the longitudinal direction L, L' comprised between 100 mm and 2000 mm.

Typically, the inner face 16, 16' of each side section 5A, 5A' has a height along the vertical direction V, V' comprised between 100 mm and 400 mm.

Each side section 5A, 5A' extends along the longitudinal direction L, L' between two longitudinal ends 5AE, 5AE'.

Typically, each side section 5A, 5A' has a thickness along the transversal direction T, T' comprised between 10 mm and 25 mm. In the Examples of FIGS. 1 and 2, at least one side section 5A, 5A' comprises through-holes 36, 36' formed therein.

The through-holes 36, 36' allow having a maximal air flow through the crate 1, 1' during ripening.

Preferably, each side section 5A, 5A' comprises through-holes 36, 36'. Preferably also, said through holes 36, 36' are provided both below and above the solid portion 26, 26'.

In the embodiments described, the through-holes 36, 36' are provided over the entire length of each side section 5A, 5A' below and above the solid portion 26, 26'.

In the first embodiment, the through-holes 36 comprise above the solid portion 26 rectangular through-holes 36A that are substantially identical to each other. The open surface of each through-hole 36A is comprised between 150 mm$^2$ and 250 mm$^2$. The width between two adjacent through-holes 36A is comprised between 3 mm and 4 mm.

In this embodiment, the through-holes 36 further comprise below the solid portion 26 rectangular through-holes 36B that are substantially identical to each other. Two rows of through-holes 36B that are substantially parallel to the base 2 are formed. Especially, the open surface of each-through-hole 36B is comprised between 150 mm$^2$ and 300 mm$^2$. The width between two adjacent through-holes 36B of a same row is comprised between 3 mm and 4 mm. The height between two adjacent through-holes 36B of different rows is comprised between 3 mm and 4 mm.

In the second embodiment, the through-holes 36' comprise above the solid strip 26' rectangular through-holes 36A' that are substantially identical to each other. The open surface of each through-hole 36A' is comprised between 30 mm$^2$ and 300 mm$^2$. The width between two adjacent through-holes 36A' is comprised between 3 mm and 4 mm. In this embodiment, the through-holes 36' further comprise below the solid portion 26' rectangular through-holes 36B' that are substantially identical to each other. The open surface of each through-hole 36B' is comprised between 150 mm$^2$ and 300 mm$^2$. The width between two adjacent through-holes 36B' is comprised between 3 mm and 4 mm.

In this embodiment, a second solid portion 38', that is substantially parallel to the solid portion 26', extends along at least 90% of the length of the side section 5A'. The second solid portion 38' extends over the entire length of the side section 5A'.

The second solid portion 38' extends in the vertical direction V' from the through-holes 36A' above the solid portion 26' to the top 3' of the crate 1'. In the embodiment described, the second solid portion 38' of the side section 5A' has a height comprised between 8% and 35% of the height of the space 8' intended to receive the cheese.

Preferably, at least one longitudinal groove 40, 40' is formed in the exterior face 20, 20' of each side section 5A, 5A'. Said longitudinal groove 40, 40' is substantially parallel to the base 2, 2'. Said groove 40, 40' opens in the end sections 5B, 5B' so that, when the crate 1, 1' is placed alongside an identical crate 1, 1', the longitudinal grooves 40, 40' of both crates 1, 1' face each other, thus forming a longitudinal channel between the crates 1, 1'.

In the first embodiment, the exterior face 20 of each side section 5A comprises a single longitudinal groove 40 arranged along the solid portion 26. The height of the groove 40 is typically comprised between 10 mm and 50 mm.

In the second embodiment, the exterior face 20' of each side section 5A' comprises a single longitudinal groove 40' arranged above the solid portion 26'. The height of the longitudinal groove 40' is typically comprised between 10 mm and 50 mm.

Alternatively, the longitudinal grooves 40, 40' are arranged differently but remain positioned so that, when the crate 1, 1' is placed alongside an identical crate, the grooves 40, 40' of both crates face each other, thus forming between the crates a longitudinal channel that is not necessarily parallel to the base 2, 2'.

In an alternative embodiment (not shown), the exterior face of each side section further comprises at least one vertical groove. Said vertical groove is substantially perpendicular to the base. Said groove opens in the base and the top so that, when the crate is placed alongside an identical crate with their side sections facing each other, the vertical grooves of both crates face each other, thus forming a vertical channel between the crates. The length of each vertical groove is typically comprised between 200 mm and 490 mm.

Preferably, the exterior face 20, 20', 22, 22' of at least one section 5A, 5A', 5B, 5B' is reinforced by a pattern of ribs 43, 43'.

More preferably, the exterior face 20, 20', 22, 22' of each section 5A, 5A', 5B, 5B' is reinforced by a pattern of ribs 43, 43'. In other terms, the exterior face 23, 23' of the peripheral wall 4, 4' is reinforced by a pattern of ribs 43, 43'.

In particular, the ribs 43, 43' of the exterior face 23, 23' of the peripheral wall 4, 4' comprise vertical ribs 43A, 43A' extending along the vertical direction V, V'.

The vertical ribs 43A, 43A' are preferably substantially parallel to one another.

Preferably, at least some of the vertical ribs 43A, 43A' extend from the base 2, 2' to the top 3, 3' of the crate 1, 1'.

In the shown examples, the ribs 43, 43' of the exterior face 23, 23' of the peripheral wall 4, 4' also comprise peripheral ribs 43B, 43B' that enclose the space 8, 8'. Preferably, at least some of the peripheral ribs 43B, 43B' are substantially perpendicular to the vertical ribs 43A, 43A'.

Preferably, at least some of the peripheral ribs 43B, 43B' are parallel to one another.

Preferably, at least some of the peripheral ribs 43B, 43B' extend along the entire periphery of the peripheral wall 4, 4' of the crate 1, 1'.

In alternative embodiments (not shown), the ribs 43, 43' of the exterior face 23, 23' of the peripheral wall 4, 4' comprise only vertical ribs 43A, 43A' or only peripheral ribs 43B, 43B'.

In the embodiments of FIGS. 1 and 2, the exterior face 20, 20' of each side section 5A, 5A' is reinforced by a pattern of ribs 44, 44'.

These ribs 44, 44' are typically at right angles to one another.

This pattern of ribs 44, 44' extends, inter alia, in the solid portion 26, 26'.

In particular, the ribs 44, 44' comprise vertical ribs 44A, 44A' extending along the vertical direction V, V'. The vertical ribs 44A, 44A' are preferably substantially parallel to one another.

The vertical ribs 44A, 44A' form a pattern that is symmetrical with respect to a plane comprising the vertical direction V, V' and the transversal direction T, T' and separating the crate 1, 1' into two longitudinal halves.

Each vertical rib 44A, 44A' extends at least from the base 2, 2' of the crate 1, 1' to the lower longitudinal edge 26B, 26B' of the solid portion 26, 26' of each side section 5A, 5A', or from the top 3, 3' to the upper longitudinal edge 26A, 26A' of the solid portion 26, 26' of each side section 5A, 5A'.

Preferably, at least some of the vertical ribs 44A, 44A' consist of entire ribs 44E, 44E' that continuously extend from the base 2, 2' to the top 3, 3' of the crate 1, 1'.

In the first embodiment, only part of the vertical ribs 44A consist of such entire ribs 44E, the other vertical ribs 44A, consisting of interrupted ribs 441 that are interrupted in the solid portion 26. In other words, these interrupted ribs 441 extend only from the base 2 of the crate 1 to the lower longitudinal edge 26B of the solid portion 26, and from the upper longitudinal edge 26A of the solid portion 26 to the top 3.

Each entire rib 44E is adjacent to another entire rib 44E and spaced from a third entire rib 44E with at least one interrupted rib 441 between them.

The number of interrupted ribs 441 between two successive entire ribs 44E is lower close to the longitudinal ends 5AE than far from the longitudinal ends 5AE. Parting from one longitudinal end 5AE, there is one interrupted rib 441 between two successive entire ribs 44E, then two interrupted ribs 441, then one interrupted rib 441 and then several times four interrupted ribs 441. In the second embodiment, all the vertical ribs 44A' consist of such entire ribs 44E'.

Each vertical rib 44A, 44A' prolongs a respective transversal rib 15A, 15A' of the base 2, 2'.

In the first embodiment, the portions of the entire ribs 44E extending above the solid portion 26 comprise straight exterior edges 44AA, some of which being substantially flush with a first common longitudinal plane while the other ones are substantially flush with a second common longitudinal plane. The portions of the interrupted ribs 441 extending above the solid portion 26 comprise a recessed exterior edge 441R that is recessed toward the space 8 intended to receive the cheese relatively to said longitudinal planes.

The portions of the vertical ribs 44A extending below the solid portion 26 comprise exterior edges 44AA that are flush with a common ruled surface swept by a longitudinal generator. Part of the interrupted ribs 441 have the exterior edge 44AF of their portion extending below the solid portion 26 that is flush with said common ruled surface. The other interrupted ribs 441 have the exterior edge 44AR of their portion extending below the solid portion 26 that is recessed toward the space 8 relatively to said common ruled surface.

In the second embodiment, some of the vertical ribs 44A' comprise exterior edges 44AA' that are flush with a common ruled surface swept by a longitudinal generator, while the other vertical ribs 44A' have exterior edges comprising at least one recessed portion 44AR' that is recessed toward the space 8' intended to receive the cheese relatively to said common ruled surface. This recessed portion 44AR' comprises slightly rounded ends.

In the shown example, the recessed portion 44AR' extends exclusively in the solid portion 26'.

Parting from one longitudinal end 5AE', there are six vertical ribs 44A' whose exterior edge 44AA' is flush with the common ruled surface. Then, each vertical rib 44A' comprising an exterior edge 44AA' flush with the common ruled surface is adjacent to another vertical rib 44A' comprising an exterior edge 44AA' flush with the common ruled surface and separated from a third vertical rib 44A' comprising an exterior edge 44AA' flush with the common ruled surface by four vertical ribs 44A' comprising an exterior edge with a recessed portion 44AR'.

In the shown examples, the ribs 44, 44' also comprise longitudinal ribs 44B, 44B' extending along the longitudinal direction L, L'. Preferably, the longitudinal ribs 44B, 44B' extend from one of the two end sections 5B, 5B' of the crate 1, 1' to the other end section 5B, 5B'. The longitudinal ribs 44B, 44B' are preferably substantially parallel to one another.

One of the longitudinal ribs 44B, 44B' extends along the upper longitudinal edge 26A, 26A' of the solid portion 26, 26' and one of the longitudinal ribs 44B, 44B' extends along the lower longitudinal edge 26B, 26B' of the solid portion 26, 26'.

Preferably, each side section 5A, 5A' is devoid of a longitudinal rib between the longitudinal ribs 44B, 44B' extending along the upper longitudinal edge 26A, 26A' and the lower longitudinal edge 26B, 26B' of the solid portion 26, 26'.

In alternative embodiments (not shown), the ribs 44, 44' comprise only vertical ribs 44A, 44A' or only longitudinal ribs 44B, 44B'.

Each end section 5B, 5B' extends along the transversal direction T, T' between two transversal ends 5BE, 5BE'. Each end section 5B, 5B' comprises a middle region 5BM, 5BM' extending along the transversal direction T, T' between the two transversal ends 5BE, 5BE' and along the vertical direction V, V' from the base 2, 2' to the top 3, 3' of the crate 1, 1'. Preferably, the middle region 5BM, 5BM' extends at least along 15% of the width of the end section 5B, 5B'.

Each end section 5B, 5B' further comprises two intermediate regions 5BI, 5BI' each interposed between the middle region 5BM, 5BM' and a respective one of the transversal ends 5BE, 5BE'.

In the examples of FIGS. 1 and 2, the inner face 18, 18' of each end section 5B, 5B' includes a vertical portion 52, 52' forming with the upper face of the base 2, 2' an angle comprised between 90° and 95°, preferably comprised between 90 and 92°. These vertical portions 52, 52' form, together with the vertical portions 30, 30' of the side sections 5A, 5A', a vertical portion 53, 53' of the peripheral wall 4, 4'.

The vertical portion 52, 52' includes the inner face of the solid portion 46, 46' of the end section 5B, 5B'. Thus, the vertical portion 53, 53' of the peripheral wall 4, 4' includes the solid strip 27, 27'.

In the first embodiment, the vertical portion 52 of the end section 5B extends over the entire height of the inner face 18 of the end section 5B.

In the second embodiment, the inner face 18' of each end section 5B' has an inclined portion 54' forming with the vertical portion 52' an angle comprised between 105° and 175°. Typically, the inclined portion 54' forms with the vertical portion 52' an angle comprised between 105° and 165°. The inclined portion 54' is located above the vertical portion 52'. The inclined portion 54' has a minimum height along the vertical direction V' of at least 5 mm.

In the Examples of FIGS. 1 and 2, each end section 5B, 5B' has an upper edge 56, 56'. The upper edge 56, 56' of at least one of the end sections 5B, 5B' comprises a recessed portion 58, 58' that is recessed from the first plane P1 defined by the upper edges 34, 34' of the side sections 5A, 5A' of at least 5% of the height of the space 8, 8' intended to receive the cheese.

In the embodiments described, the upper edges 56, 56' of the two end sections 5B, 5B' comprise the recessed portion 58, 58'.

Typically, the recessed portion 58, 58' is transversely centered on the end section 5B, 5B'. The recessed portion 58, 58' extends continuously along at least 15% of the width of the end section 5B, 5B'.

Figure 3:
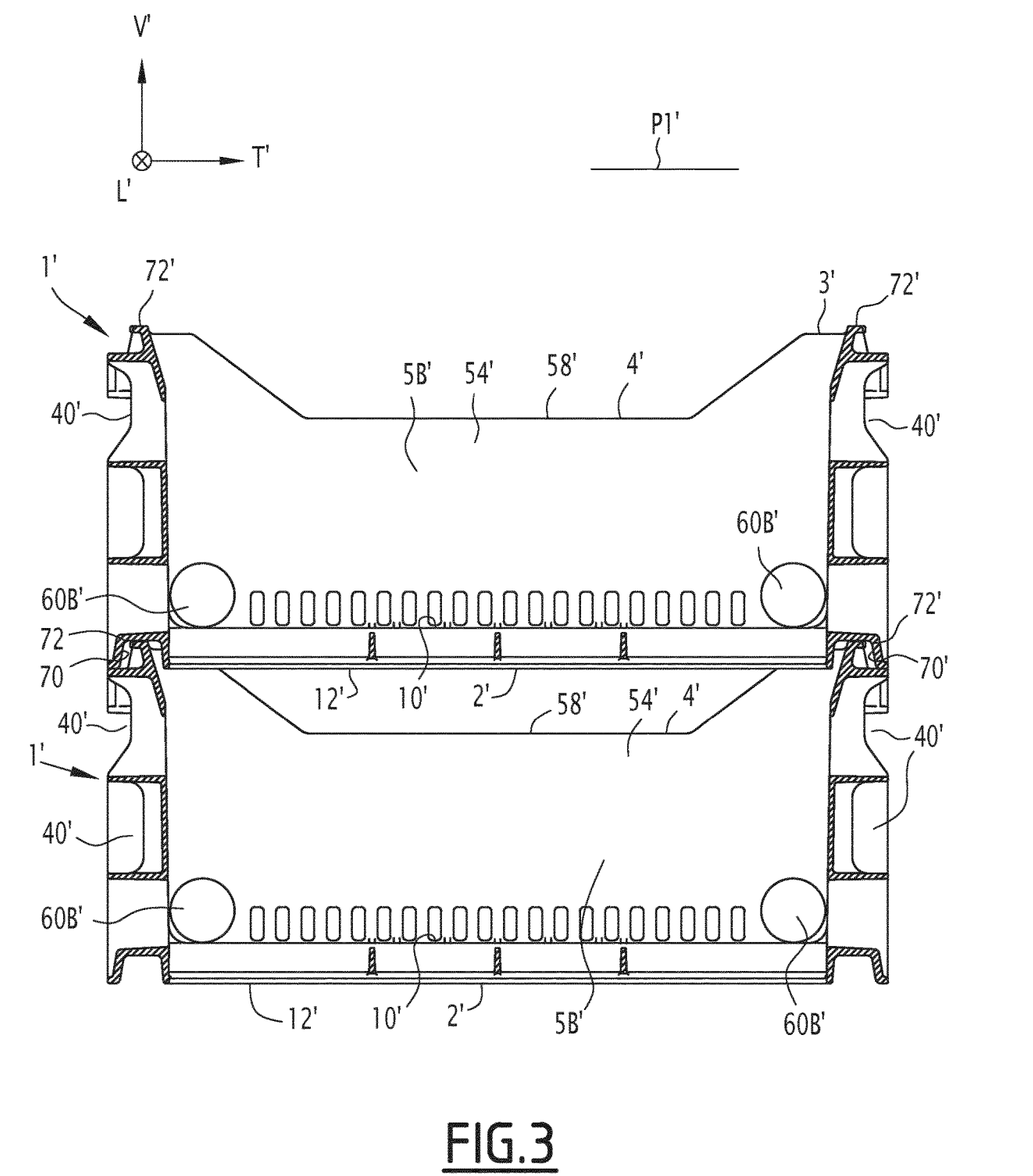
FIG. 3 shows a schematic cross-sectional view of the crate of FIG. 2 stacked on top of an identical crate.

As visible on FIG. 3, such a recessed portion 58, 58' allows seeing cheese inside the crate 1, 1' during ripening when crates are stacked, touching cheese to control the firmness or taking samples.

Typically, the inner face 18, 18' of each end section 5B, 5B' has a width along the transversal direction T, T' comprised between 250 mm and 260 mm.

Typically, the inner face 18, 18' of each end section 5B, 5B' has a maximum height along the vertical direction V, V' comprised between 70 mm and 100 mm.

Typically, each end section 5B, 5B' has a thickness along the longitudinal direction L, L' comprised between 5 mm and 10 mm.

Each end section 5B, 5B' further has at least one through-hole 60, 60' formed therein. Preferably, each end section 5B, 5B' has a plurality of through-holes 60, 60' formed therein.

In the first embodiment, the through-holes 60 are provided exclusively below the solid portion 46. In this embodiment, the through-holes 60 are provided over the entire width of the end section 5B. Typically, two consecutive through-holes 60 are separated by a vertical solid part 61 of the end section 5B or by a longitudinal solid part 63 of the end section 5B. The width between two adjacent through-holes 60 is comprised between 3 mm and 4 mm. The open surface of each through-hole 60 is comprised between 200 mm$^2$ and 300 mm$^2$.

In the second embodiment, the through-holes 60' are provided exclusively below the solid portion 46' of the end section 5B'. Typically, the through-holes 60' comprise oblong through-holes 60A' that are substantially identical. The oblong through-holes 60A' are transversely centered on the end section 5B'. The width between two adjacent oblong through-holes 60A' is comprised between 4 mm and 6 mm. The open surface of each oblong through-hole 60A' is comprised between 50 mm$^2$ and 100 mm$^2$.

In this embodiment, the through-holes 60' formed in the end section 5B' further comprise on either side of the oblong through-holes 60A' one round through-hole 60B'. The diameter of each round through-hole 60B' is comprised between 20 mm and 30 mm.

Other shapes of through-holes than the ones herein described are also part of the scope of the invention, for example polygons and so on.

Preferably, the exterior face 22, 22' of each end section 5B, 5B' is reinforced by a pattern of ribs 62, 62'. The ribs 62, 62' on the exterior face 22, 22' of each end section 5B, 5B' are typically interlaced to form trapezes or rectangles.

In particular, the ribs 62, 62' comprise vertical ribs 62A, 62A' extending along the vertical direction V, V'. The vertical ribs 62A, 62A' are preferably substantially parallel to one another.

Preferably, at least some of the vertical ribs 62A, 62A' extend from the base 2, 2' to the top 3, 3' of the crate 1, 1'.

In the shown examples, the ribs 62, 62' also comprise transversal ribs 62B, 62B' extending along the transversal direction T, T'. Preferably, the transversal ribs 62B, 62B', extend from one of the two side sections 5A, 5A' of the crate 1, 1' to the other side section 5A, 5A'.

The pattern of ribs 62, 62' is preferably symmetrical with respect to a plane comprising the vertical direction V, V' and the longitudinal direction L, L' and separating the crate 1, 1' into two transversal halves.

In the embodiment of FIG. 1, the transversal ribs 62B are arranged to form either trapezes or rectangles with the vertical ribs 62A.

In the embodiment of FIG. 2, the transversal ribs 62B' are parallel to one another.

Preferably, at least some of the transversal ribs 62B, 62B' of each end section 5B, 5B' prolong the longitudinal ribs 44B, 44B' of each side section 5A, 5A' thus forming the peripheral ribs 43B, 43B'.

In alternative embodiments (not shown), the ribs 62, 62' comprise only vertical ribs 62A, 62A' or only transversal ribs 62B, 62B'.

These ribs 62, 62' extend, inter alia, in the solid portion 46, 46'.

Such a configuration of the sections 5A, 5A', 5B, 5B' increases strength and stiffness of the crate 1, 1' in order to maintain the shape of a cheese during ripening, in particular a cheese with a propionic fermentation which expands during ripening, while ensuring a proper ventilation of the cheese.

The ribs 44, 44', 62, 62' located on the exterior face 20, 20', 22, 22' of each wall 5A, 5A', 5B, 5B' at the interface 64, 64' between each side section 5A, 5A' and each end section 5B, 5B' are arranged so that the projection of such a rib 44, 44', 62, 62' in a plane substantially parallel to the base 2, 2' has a continuous profile and the slope of said profile also varies continuously. In other terms, the crate 1, 1' is devoid of sharp angles at the interface 64, 64' between the exterior face 20, 20' of a side section 5A, 5A' and the exterior face 22, 22' of an end section 5B, 5B'.

Thus, when the crate 1, 1' is placed alongside an identical crate 1, 1', one side section 5A, 5A' of the first crate 1, 1' faces one side section 5A, 5A' of the other crate 1, 1', but the angles between the facing side sections 5A, 5A' of each crate 1, 1' and the respective adjacent end sections 5B, 5B' of each crate 1, 1' are not in contact, thus forming a vertical channel between the crates 1, 1'. This vertical channel is also obtained in an advantageous way when another pair of two additional crates 1, 1' is added, their end sections 5B, 5B' facing the end sections 5B, 5B' of the two previous crates 1, 1'. This vertical channel is also obtained in an advantageous way when the end sections 5B, 5B' of the two crates 1, 1' are facing a plane and vertical surface such as a wall. Such a vertical channel ensures proper ventilation of the cheese.

The ribs 62, 62' of each end section 5B, 5B' comprise exterior edges 62AA, 62AA' that are flush with a common ruled surface swept by a vertical generator.

The portions of these exterior edges 62AA, 62AA' that are located at both transversal ends 5BE, 5BE' and in the middle region 5BM, 5BM' are flush with a common transversal plane.

In the first embodiment, the exterior face 22 of each end section 5B comprises two vertical grooves 5VG on both sides of the middle region 5BM along the transversal direction T. Each vertical groove 5VG is substantially perpendicular to the base 2 and opens in the base 2 and the top 3 so that, when the crate 1 is placed alongside an identical crate with their side sections 5B facing each other, the vertical grooves 5VG of both crates 1 face each other, thus forming a vertical channel between the crates 1.

In particular, these vertical grooves 5VG are formed by the portions of the exterior edges 62AA of the ribs 62 that are located in the intermediate regions 5B1 being recessed toward the space 8 intended to receive the cheese relatively to said common transversal plane.

Figure 7:
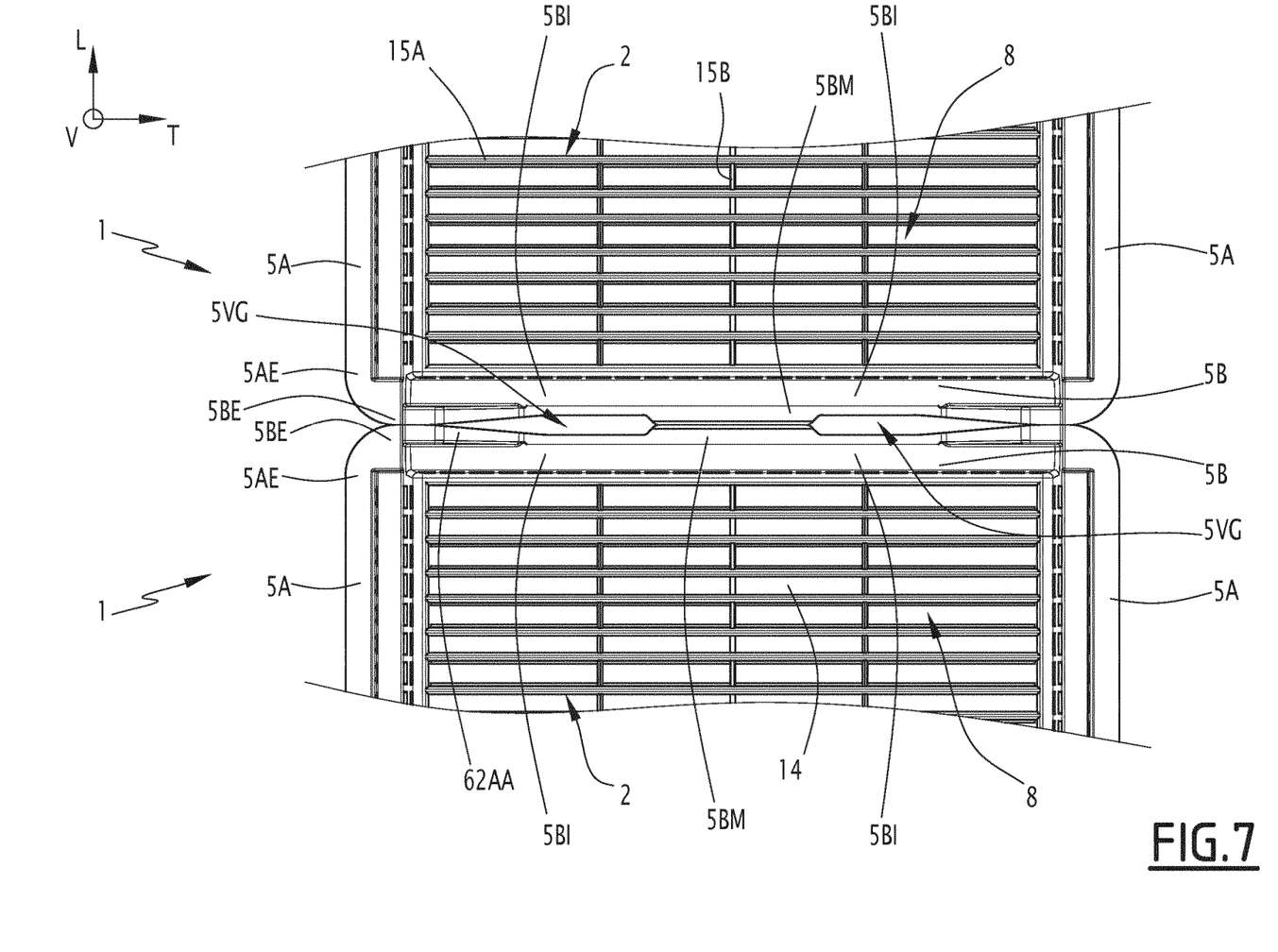
FIG. 7 shows a partial top view of the crate of FIG. 1 adjacent to an identical crate so that an end section of the crate faces an end section of the other crate.

Thus, as shown in FIG. 7, when the crate 1 is adjacent to an identical crate 1 so that one end section 5B of the first crate 1 faces one end section 5B of the other crate 1, the middle region 5BM and the transversal ends 5BE of the end section 5B of the first crate 1 are in contact, respectively, with the middle region 5BM and the transversal ends 5BE of the end section 5B of the other crate 1 that faces the end section of the first crate 1, while the intermediate regions 5B1 of the end sections 5B of both crates 1 are spaced apart from one another, thus forming between the crates 1 two vertical channels on both sides of the middle region 5BM along the transversal direction T.

In the second embodiment, the portions of the exterior edges 62AA' that are located in the intermediate regions 5B1' are flush with the common transversal plane, so that no vertical groove is formed in the exterior face 22' of any of the end sections 5B'.

In alternative embodiments (not shown), the ribs of each end section 5B, 5B' comprise exterior edges 62AA, 62AA' that are flush with a common ruled surface swept by a vertical generator forming one or more than two vertical channels between two adjacent crates.

In the second embodiment, the crate 1' comprises a pair of runners 70' on the base 2'.

Each runner 70' is formed in the lower face 12' of the base 2' of the crate 1', along the rim of the base 2', opposite the other runner 70' of the pair.

A pair of complementary rails 72' is formed on the top of the peripheral wall 4' so that, when the crate 1' is stacked under an identical crate, each rail 72' of the crate 1' is engaged inside a runner 70' of said identical crate.

Thus, the top of the peripheral wall 4' is prevented from diverging to the outside of the crate 1' under the pressure induced by the ripening cheese and contributes to maintain the cheese shape during the ripening process.

In particular, the runners 70' are, in the shown example, longitudinal and positioned on each side of the base 2'. Each runner 70' extends along at least 75% of the length of the base 2'. Preferably, each runner 70' extends from one longitudinal end 7' of the base 2' to the opposite longitudinal end 7', and opens in both longitudinal ends 7'.

Furthermore, the longitudinal rails 72' are each positioned on the top 76' of a respective side section 5A'. Each rail 72' extends along at least 75% of the length of the respective side section 5A'. Preferably, the rail 72' extends from one longitudinal end 74' of the top 76' of the side section 5A' to the opposite longitudinal end 74'.

Thanks to this specific configuration, the rails 72' of the crate 1' do not only prevent the tops 76' of the side sections 5A' from moving away from each other when the crate 1' is stacked under an identical crate 1', but also allow unstacking the crates by sliding the runner 72' of the upper crate 1' along the rail 72' of the lower crate 1'.

In alternative embodiments (not shown), the runners 70' of the pair meet to form a single runner. In other alternative embodiments (not shown), the crate 1' comprises several pairs of runners 70' and several pairs of complementary rails 72'.

In the second embodiment, the crate 1' further comprises gripping elements 80'. The gripping elements 80' are typically located at the interface 82' between the lower face 12' of the base 2' and the exterior face 20', 22' of at least one of the end sections 5B' and the side sections 5A'. Preferably, the gripping elements 80' are located at the interface 82' between the lower face 12' of the base 2' and the exterior face 22' of at least one of the end sections 5B'. The gripping elements 80' are transversely centered at the interface 82' between the lower face 12' of the base 2' and the exterior face 22' of at least one of the end sections 5B'. The gripping elements 80' extend along at least 15% of the width of the end section 5B'.

The gripping elements 80' typically consist of several identical reliefs fixed to the lower face 12' of the base 2' and to the exterior face 22' of at least one of the end sections 5B'. The projection of each gripping element 80' in a plane comprising the vertical direction V' and the longitudinal direction L' has a continuous profile whose slope varies continuously. In other terms, the projection of each gripping element 80' in a plane comprising the vertical direction V' and the longitudinal direction L' has a profile devoid of sharp angles. The gripping elements 80' provide smooth angles allowing an operator to seize the crate 1' easily as opposed to sharp angles.

Moreover, when stacking or unstacking two identical crates 1', the gripping elements 80' of the upper crate 1' are free to access through the recessed portion 58' of the end section 5B' of the lower crate 1'.

A method for foil-ripening at least one cheese according to the invention will now be described.

Each cheese is provided. Preferably, each cheese is a cheese which shape has to be managed during the manufacturing process of the cheese.

Said cheese may be a hard cheese with a moisture content comprised between 20 and 42%, or a semi-hard cheese with a moisture content comprised between 44% and 55%.

The cheese is preferably selected from the group consisting of: Maasdam, Jarlsberg, Leerdammer, Comté, Edam, Gouda, Cantal, Fontina, Cheshire, Cheddar, Gloucester, Derby, Leicester, Sveci, Dunlop, Turunmaa, Grana, Emmental, Gruyere, Beaufort, Herrgardsost, Asiago, Sbrinz, Scamorza, Provolone, Caciocavallo, Mozzarella, Kaaseri, Kashlaval, Perenica, Saint Paulin, Caerphilly, Lancashire, Trappist, Providence, Herve, Limburg, Romadur, Munster, Tilsit, Vacherin-Mont d'Or, Remoudou, Srainbuskerkase, Brick, Stilton, Roquefort, Gorgonzola, Danablu, Mycelia, Wensleydale, Blue Vinny, Gammelost, Adelost, Tiroler-Graukäse, Edelspitekäse, Aura, Cabrales, Passendale, Danbo, Castelo, Grevé, Swiss Cheese.

More preferably, the cheese is a cheese with propionic fermentation.

Cheeses with propionic fermentation are often called Swiss-type cheeses.

They are visually characterized by having round regular eyes which vary in terms of size from medium to large.

Each cheese is placed in a brine bath for a predetermined period of time, and removed from the brine bath after the predetermined period of time.

Optionally, each cheese is then packaged in a foil for ripening cheese. Foils for ripening cheese have a selective permeability. They are well-known of the skilled in the art and comprise, for example PolyEthylene (PE), PolyAmide (PA), EthyleneVinyl alcohol (EVOH), PolyVinylChloride (PVC), PolyVinylDiChloride (PVDC).

Typically, a block-shaped foil packed cheese, after brining, has a length dimension comprised between 100 mm and 2000 mm.

Typically, the block-shaped foil packed cheese, after brining, has a width dimension comprised between 210 mm and 270 mm.

Typically, the block-shaped foil packed cheese, after brining, has a height dimension comprised between 80 mm and 110 mm.

The standard length of the blocks is comprised between 485 mm and 1015 mm.

Each cheese is then placed in a respective crate 1, 1' according to the invention for ripening. Each cheese typically ripens for a predetermined period of time. Typically, after a pre-ripening phase of approximately 8 to 21 days at a temperature of approximately 8-15° C., the so-called warm-room curing phase is commenced by raising the temperature to approximately 15-25° C. for approximately 7 to 21 days.

When several identical crates 1, 1' are provided, the crates 1, 1' are preferably placed alongside to each other and/or stacked. The air flows through the through-holes 14, 14', 36, 36', 60, 60' and/or through the longitudinal grooves 40, 40' formed in the side sections 5A, 5A' and/or through the vertical channels formed between the angles of the crates 1, 1' and/or through the vertical grooves formed in the side sections, and/or through the vertical channels formed between two facing end sections 5B of the crates 1.

After cheeses are sufficiently ripened the cheeses are cooled down for further processing. In the post-ripening phase, the temperature is typically reduced to approximately 5-10° C., the cheeses being removed from the brine for a total of at least 20 days.

The stacked crates 1, 1' are unstacked and the ripened cheeses are removed from the crates 1, 1'. The crates 1, 1' according to the invention allow shaping the cheese and avoid cheese widening during fermentation.

Moreover, air circulation between the crates is optimized, and when crates 1, 1' are stacked on top of each other fermentation of the cheese is homogenous in all crates 1, 1'.

The invention claimed is:

1. A crate for a cheese, said crate comprising a base an open top substantially parallel to the base, a peripheral wall extending from the base to the top in a vertical direction, the peripheral wall forming a closed contour and forming with the base a space intended to receive the cheese, said space having a height along the vertical direction, the peripheral wall having at least one through-hole formed therein and comprising a medium portion which is approximately at mid-height of the space intended to receive the cheese, the peripheral wall comprising a solid strip enclosing the space intended to receive the cheese while being substantially parallel to the base, said solid strip including the medium portion of the peripheral wall and having a minimum height which is at least 15% of the height of the space intended to receive the cheese, wherein the peripheral wall consists of several sections juxtaposed to each other along the periphery of the base, said sections comprising two end sections positioned on opposite ends of the base in a longitudinal direction, and two side sections positioned on opposite sides of the base in a transversal direction substantially perpendicular to the longitudinal direction and further wherein the base comprises transversal ribs extending along the transversal direction from one side section to the other side section, and each transversal rib of the base has a Z-shaped longitudinal section comprising a central portion extending along the vertical direction and two extreme portions each protruding from a respective side of the central portion along the longitudinal direction.

2. The crate according to claim 1, said crate comprising at least one pair of runners on the base, each runner being formed in the lower face of the base of the crate, along the rim of the base, opposite the other runner of the pair, and at least one pair of complementary rails formed on the top of the peripheral wall so that, when the crate is stacked under an identical crate, each rail of the crate is engaged inside a runner of said identical crate.

3. The crate according to claim 2, wherein the base has two longitudinal ends, each runner extending from one longitudinal end of the base to the opposite longitudinal end, and opening in both longitudinal ends.

4. The crate according to claim 1, wherein through holes are provided both below and above the solid strip.

5. The crate according to claim 1 wherein the base has a substantially plane upper face oriented toward the top, and the peripheral wall has an inner face oriented toward the space intended to receive the cheese, said inner face including a vertical portion forming with the upper face of the base an angle comprised between 90° and 95°, said vertical portion enclosing the inner face of the solid strip of the peripheral wall.

6. The crate according to claim 5, wherein the peripheral wall includes at least one section with an inner face including a vertical part of the vertical portion and an inclined portion forming with the vertical part an angle comprised between 105° and 175°, the inclined portion having a minimum height which is at least 5 mm, the inclined portion being above the vertical part.

7. The crate according to claim 1, wherein the exterior face of each side section is reinforced by a pattern of ribs, the ribs comprising vertical ribs extending along the vertical direction, each vertical rib prolonging a respective transversal rib of the base.

8. The crate according to claim 1, wherein each section has an exterior face oriented opposite the space intended to receive the cheese, the exterior face-of each section being reinforced by a pattern of ribs, and the ribs being located on the exterior face of each section at the interface between each side section and each end section are arranged so that the projection of such a rib in a plane substantially parallel to the base has a continuous profile and the slope of said profile also varies continuously.

9. The crate according to claim 1, wherein the exterior face of each end section is reinforced by a pattern of ribs comprising transversal ribs extending along the transversal, the exterior face of each side section is reinforced by a pattern of ribs comprising longitudinal ribs extending along the longitudinal direction, and at least one of the transversal ribs of each end section prolongs a longitudinal rib of each side section thus forming a peripheral rib that encloses the space.

10. The crate according to claim 1, wherein each section has at least one through-hole formed therein.

11. The crate according to claim 1, wherein each side section has an exterior face oriented opposite the space intended to receive the cheese, at least one longitudinal groove being formed in said exterior face and opening in the end sections so that, when the crate is placed alongside an identical crate, the longitudinal grooves of the two crates face each other, thus forming a longitudinal channel between the crates.

12. The crate according to claim 1, wherein each side section has an exterior face oriented opposite the space intended to receive the cheese, at least one vertical groove being formed in said exterior face and opening in the base and in the top so that, when the crate is placed alongside an identical crate with their side sections facing each other, the vertical grooves of the two crates face each other, thus forming a vertical channel between the crates, and/or each end section has an exterior face oriented opposite the space intended to receive the cheese, at least one vertical groove being formed in said exterior face and opening in the base and in the top so that, when the crate is placed alongside an identical crate with their end sections facing each other, the vertical grooves of the two crates face each other, thus forming a vertical channel between the crates.

13. The crate according to claim 1, wherein each side section has an upper edge that is substantially parallel to the base, the upper edges of both side section being comprised in a same plane, and wherein each end section has an upper edge, the upper edge of at least one of the end sections being recessed from said plane of at least 5% of the height of the space intended to receive the cheese.

14. The crate according to claim 1, wherein each side section and each end section is substantially rectilinear.

15. A method for ripening at least one cheese, the method comprising the steps of: a. providing the or each cheese; b. placing the or each cheese in a respective crate, said respective crate consisting of a crate according to claim 1; and c. ripening the or each cheese in its respective crate.

16. The method according to claim 15, wherein at least two cheeses are provided at step a., the method further comprising between step b. and step c. a step d. of stacking the crates.

17. The method according to claim 15, wherein the cheese consists of a cheese which shape has to be managed during the manufacturing process of the cheese.

* * * * *